(12) United States Patent
Bae

(10) Patent No.: US 12,495,262 B2
(45) Date of Patent: Dec. 9, 2025

(54) METHOD AND APPARATUS FOR GENERATING SOUND FOR MIXED REALITY ENVIRONMENTS

(71) Applicant: WHOBORN INC., Seoul (KR)

(72) Inventor: Young Sik Bae, Seoul (KR)

(73) Assignee: WHOBORN INC., Seoul (KR)

( * ) Notice: Subject to any disclaimer, the term of this patent is extended or adjusted under 35 U.S.C. 154(b) by 114 days.

(21) Appl. No.: 17/292,447

(22) PCT Filed: Nov. 8, 2019

(86) PCT No.: PCT/KR2019/015145
§ 371 (c)(1),
(2) Date: May 9, 2021

(87) PCT Pub. No.: WO2020/096406
PCT Pub. Date: May 14, 2020

(65) Prior Publication Data
US 2022/0021998 A1    Jan. 20, 2022

(30) Foreign Application Priority Data

| Nov. 9, 2018 | (KR) | 10-2018-0136955 |
| May 3, 2019 | (KR) | 10-2019-0052338 |
| Jul. 30, 2019 | (KR) | 10-2019-0092596 |
| Oct. 16, 2019 | (KR) | 10-2019-0128553 |
| Oct. 18, 2019 | (KR) | 10-2019-0129756 |
| Nov. 5, 2019 | (KR) | 10-2019-0140346 |
| Nov. 5, 2019 | (KR) | 10-2019-0140347 |

(51) Int. Cl.
*H04S 5/00* (2006.01)
*H04S 7/00* (2006.01)

(52) U.S. Cl.
CPC .............. *H04S 5/005* (2013.01); *H04S 7/303* (2013.01); *H04S 2400/13* (2013.01)

(58) Field of Classification Search
None
See application file for complete search history.

(56) References Cited

U.S. PATENT DOCUMENTS

| 2016/0379660 A1* | 12/2016 | Wright | H04M 3/568 |
| | | | 381/57 |
| 2018/0035234 A1* | 2/2018 | Roach | H04S 7/303 |
| 2018/0246698 A1* | 8/2018 | Huang | H04R 1/32 |
| 2019/0200158 A1* | 6/2019 | Verbeke | G06F 3/005 |
| 2019/0324708 A1* | 10/2019 | Miyazaki | G06F 3/16 |
| 2022/0036075 A1* | 2/2022 | Fradet | G06F 3/167 |

FOREIGN PATENT DOCUMENTS

WO    WO-2018128161 A1 *  7/2018  ........... G02B 27/017

OTHER PUBLICATIONS

English machine translation of WO-2018128161-A1 (Year: 2018).*

* cited by examiner

*Primary Examiner* — James K Mooney
(74) *Attorney, Agent, or Firm* — Columbia IP Law

(57) ABSTRACT

Disclosed are a method for generating a sound, and devices for performing same. The method for generating a sound, according to one embodiment, includes the acquiring a real sound generated in a real space, and a play sound generated in a virtual space, and generating, by combining the real sound and the play sound, a combined sound generated in a mixed reality in which the real space and the virtual space are mixed.

17 Claims, 11 Drawing Sheets

| Headphone |
|---|
| Microphone or sensor |
| Speaker x2 + α |
| Compass + α mems |
| Bluetooth or WiFi or RF |
| ETC (Line, Battery) |

1. Noise cancel
   - Noise canceling is possible by analyzing noise level of user's surrounding environment using Microphone or Sensor.

2. Head tracking
   - Basically, Compass mems should be used for head tracking.
   - If Gyroscope or Accelator mems other than Compass mems is used, more precise head tracking effect can be applied.

3. Matters corresponding to wireless communication/wired communication
   - It supports wireless communication such as Bluetooth, WiFi and RF communication, and wired communication through line connection is also supported.

4. Headphone/Earphone
   - Support in the form of Headphone or Earphone is possible according to user's request.

1. Headphone type
2. Helmet type
3. Goggle type
4. Wearable speaker type
   - Hair band
   - Shoulder
   - Jumper, Jacket
   - Space suit
5. Glasses type
6. Earphone type

METHOD AND APPARATUS FOR GENERATING SOUND FOR MIXED REALITY ENVIRONMENTS

RELATED APPLICATION

This application claims benefit of priority to Korean Patent Application Serial number 1020180136955, filed on Nov. 9, 2018, Korean Patent Application Serial number 1020190052338, filed on May 3, 2019, Korean Patent Application Serial number 1020190092596, filed on Jul. 30, 2019, Korean Patent Application Serial number 1020190128553, filed on Oct. 16, 2019, Korean Patent Application Serial number 1020190129756, filed on Oct. 18, 2019, Korean Patent Application Serial number 1020190140346, filed on Nov. 5, 2019, Korean Patent Application Serial number 1020190140347, filed on Nov. 5, 2019, and PCT/KR2019/015145, filed on Nov. 8, 2019 titled: METHOD FOR GENERATING SOUND AND DEVICES FOR PERFORMING SAME, which are all incorporated herein by reference in their entirety for all purposes.

INFORMATION

Unless otherwise indicated herein, the approaches described in this section are not prior art to the claims in this application and are not admitted to be prior art by inclusion in this section.

Recently, various pieces of three-dimensional (3D) audio-only content can be provided to a user. For example, recently, 3D audio-only content may be provided to a user by outputting a separately recorded 3D sound.

3D audio-only content is a 3D sound and can be various pieces of content generated using the separately recorded 3D sound as described above. For example, recently, various pieces of 3D audio-only content have been created by performing directionality and automated calculations on a general 2D sound (or acoustic). 3D audio-only content may be sound content acquired by applying a 3D sound conversion and output technology to a general 2D sound.

3D audio-only content has the advantage of being able to reproduce high immersion and a sense of reality than existing 3D sound content.

All subject matter discussed in this section of this document is not necessarily prior art and may not be presumed to be prior art simply because it is presented in this section. Plus, any reference to any prior art in this description is not and should not be taken as an acknowledgement or any form of suggestion that such prior art forms parts of the common general knowledge in any art in any country. Along these lines, any recognition of problems in the prior art are discussed in this section or associated with such subject matter should not be treated as prior art, unless expressly stated to be prior art. Rather, the discussion of any subject matter in this section should be treated as part of the approach taken towards the particular problem by the inventor(s). This approach in and of itself may also be inventive. Accordingly, the foregoing summary is illustrative only and not intended to be in any way limiting. In addition to the illustrative aspects, embodiments, and features described above, further aspects, embodiments, and features will become apparent by reference to the drawings and the following detailed description.

SUMMARY

Described herein are various illustrative methods and apparatus for generating a sound. Example methods may include receiving a real sound generated in a real space and a play sound generated in a virtual space, and generating, by combining the real sound and the play sound, a combined sound generated in a mixed reality in which the real space and the virtual space are mixed.

Example apparatus may include a memory having instructions, and a processor for executing the instructions, where the processor receive a real sound generated in a real space and a play sound generated in a virtual space and generates, by combining the real sound and the play sound, a combined sound generated in a mixed reality in which the real space and the virtual space are mixed.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 6 illustrates an example for describing the sound output device illustrated in FIG. 1;

FIG. 7 illustrates another example for describing the sound output device illustrated in FIG. 1;

DETAILED DESCRIPTION

Figure 1:
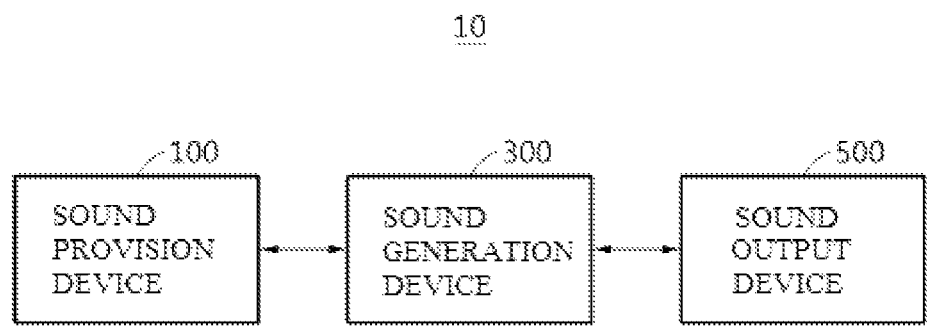
FIG. 1 illustrates a schematic block diagram of a system for generating a sound according to an embodiment.

Hereinafter, embodiments will be described in detail with reference to the accompanying drawings. However, since various changes may be made to the embodiments, the scope of rights of the patent application is not limited or restricted by these embodiments. It should be understood that all changes, equivalents, or substitutes to the embodiments are included in the scope of the rights.

The terms used in the embodiments are used for illustrative purposes only and should not be interpreted as limiting. A singular expression includes a plural expression unless it is explicitly meant differently in the context. In the present specification, it is to be understood that terms such as "include" or "have" are intended to designate the existence of features, numbers, methods, actions, components, parts, or combinations thereof described in the specification and do not preclude the possibility of the presence or addition of one or more other features or numbers, methods, actions, components, parts, or combinations thereof.

Terms such as first and second may be used to describe various components, but the components are not limited by the terms. Terms are used only for the purpose of distinguishing one component from another component. For example, a second component may be named as a first component without departing from the scope of rights according to the concept of the embodiment, and similarly, the second component may also be named as the first component.

Unless otherwise defined, all terms used herein including technical or scientific terms have the same meaning as generally understood by a person of ordinary skill in the art to which the present invention pertains. Terms such as those defined in a generally used dictionary, should be interpreted as having a meaning consistent with the meaning in the context of the related technology, and are not to be interpreted as an ideal or excessively formal meaning unless explicitly defined in the present application.

In addition, in describing the embodiments with reference to the accompanying drawings, the same reference numerals are assigned to the same components regardless of the drawing numerals, and redundant descriptions thereof will be omitted. In describing the embodiments, when it is determined that a detailed description of related known technologies may unnecessarily obscure the subject matter of the embodiments, a detailed description thereof will be omitted.

A module in the present specification may mean hardware capable of performing functions and operations according to each name described in the present specification, may mean a computer program code capable of causing a specific function and operation to be performed, or may mean an electronic recording medium, for example, a processor or a microprocessor in which the computer program code capable of causing the specific function and operation to be performed is installed.

In other words, the module may mean a functional and/or structural combination of hardware for implementing the technical idea of the present invention and/or software for driving the hardware.

Hereinafter, embodiments will be described in detail with reference to the accompanying drawings. However, the scope of the patent application is not limited or restricted by these embodiments. The same reference numerals illustrated in each drawing indicate the same members.

This disclosure is drawn, inter alia, to embodiments that may provide a technology for generating a combined sound generated in a mixed reality in which a real space and a virtual space are mixed by combining a real sound generated in the real space and a virtual sound generated in the virtual space.

In addition, embodiments may provide a technology for generating a 3D sound track reflecting a 3D object sound by converting each of a plurality of 2D object sounds of a 2D sound track into a 3D object sound.

Some approaches described in the present disclosure may include a method for generating a sound, according to one embodiment, may include acquiring a real sound generated in a real space and a play sound generated in a virtual space, and generating, by combining the real sound and the play sound, a combined sound generated in a mixed reality in which the real space and the virtual space are mixed.

In some examples, the generating method may include selecting at least one real object sound from among a plurality of real object sounds included in the real sound, selecting at least one virtual object sound from among a plurality of virtual object sounds included in the play sound, and generating the combined sound by combining the at least one real object sound and the at least one virtual object sound. The plurality of real object sounds may be sounds generated from a plurality of real objects positioned in the real space. The plurality of virtual object sounds may be sounds generated from a plurality of virtual objects positioned in the virtual space.

In some examples, the selecting the at least one real object sound may include recognizing the plurality of real object sounds based on the characteristics of an object sound, and selectively extracting the at least one real object sound from among the plurality of real object sounds based on a real sound selection condition.

In some examples, recognizing may include removing a noise sound from the real sound based on a noise filtering technique, and recognizing the plurality of real object sounds from the real sound from which the noise sound has been removed based on at least one of a frequency and volume of the object sound.

In some examples, generating may include adjusting the volume of the at least one real object sound based on a position of a real object corresponding to the at least one real object sound, generating the combined sound by combining the at least one real object sound whose volume is adjusted and the at least one virtual object sound.

In some examples, adjusting may include determining the position of the real object in the real space based on a sound acquisition time of the at least one real object sound, and adjusting the volume of the at least one real object sound based on a separation distance between the position of the user and the position of the real object.

Some approaches described in the present disclosure may include a device that may include a memory having instructions and a processor for executing the instructions. The processor may acquire a real sound generated in a real space and a play sound generated in a virtual space and generate, by combining the real sound and the play sound, a combined sound generated in a mixed reality in which the real space and the virtual space are mixed.

In some examples, the processor may select at least one real object sound from among a plurality of real object sounds included in the real sound, select at least one virtual object sound from among a plurality of virtual object sounds included in the play sound, and generate the combined sound by combining the at least one real object sound and the at least one virtual object sound. The plurality of real object sounds may be sounds generated from a plurality of real objects positioned in the real space. The plurality of virtual object sounds may be sounds generated from a plurality of virtual objects positioned in the virtual space.

In some examples, the processor may recognize the plurality of real object sounds based on the characteristics of an object sound, and the processor may selectively extract the at least one real object sound from among the plurality of real object sounds based on a real sound selection condition.

In some examples, the processor may remove a noise sound from the real sound based on a noise filtering technique and the processor may recognize the plurality of real object sounds from the real sound from which the noise sound has been removed based on at least one of a frequency and volume of the object sound.

In some examples, the processor may adjust the volume of the at least one real object sound based on a position of a real object corresponding to the at least one real object sound, and the processor may generate the combined sound by combining the at least one real object sound whose volume is adjusted and the at least one virtual object sound.

In some examples, the processor may determine the position of the real object in the real space based on a sound acquisition time of the at least one real object sound, and the processor may adjust the volume of the sound of the at least one real object based on a separation distance between the position of the user and the position of the real object.

Some approaches described in the present disclosure may include a method for generating a sound, according to another embodiment, which may include extracting a plurality of 2D object sounds included in a 2D sound track, converting, by applying each of a plurality of binaural effects to each of the plurality of 2D object sounds, the plurality of 2D object sounds into a plurality of 3D object sounds, and generating a 3D sound track based on the plurality of 3D object sounds. The plurality of 2D object sounds may be sounds separated by any one of a frequency and an object in the 2D sound track.

In some examples, extracting may include a method of extracting the plurality of 2D object sounds by separating the 2D sound track for each frequency band using an equalizer effect.

In some examples, extracting may include a method of extracting the plurality of 2D object sounds by separating the 2D sound track for each object using sound detecting.

In some examples, converting may include generating, by applying a first binaural effect to a first 2D object sound among the plurality of 2D object sounds, a first 3D object sound and generating, by applying a second binaural effect to a second 2D object sound among the plurality of 2D object sounds, a second 3D object sound.

The first binaural effect and the second binaural effect may be different from each other or may be the same binaural effect.

In some examples, generating the first 3D object sound may include determining a first 3D positioning for the first 2D object sound and generating, by applying the first 3D positioning and the first binaural effect to the first 2D object sound, the first 3D object sound.

In some examples, generating the second 3D object sound may include determining a second 3D positioning for the second 2D object sound differently from the first 3D positioning and generating, by applying the second 3D positioning and the second binaural effect to the second 2D object sound, the second 3D object sound.

In some examples, generating may include generating the 3D sound track by muxing the plurality of 3D object sounds.

Some approaches described in the present disclosure may include a device, according to another embodiment, which may include a memory containing instructions and a processor for executing the instructions. The processor may extract a plurality of 2D object sounds included in a 2D sound track, convert, by applying each of a plurality of binaural effects to each of the plurality of 2D object sounds, the plurality of 2D object sounds into a plurality of 3D object sounds, and generate a 3D sound track based on the plurality of 3D object sounds.

The plurality of 2D object sounds may be sounds separated by any one of a frequency and an object in the 2D sound track.

In some examples, the processor may extract the plurality of 2D object sounds by separating the 2D sound track for each frequency band using an equalizer effect.

In some examples, the processor may extract the plurality of 2D object sounds by separating the 2D sound track for each object using sound detecting.

In some examples, the processor may generate, by applying a first binaural effect to a first 2D object sound among the plurality of 2D object sounds, a first 3D object sound, and generate, by applying a second binaural effect to a second 2D object sound among the plurality of 2D object sounds, a second 3D object sound.

The first binaural effect and the second binaural effect may be different from each other or may be the same binaural effect.

In some examples, the processor may determine a first 3D positioning for the first 2D object sound, and generate, by applying the first 3D positioning and the first binaural effect to the first 2D object sound, the first 3D object sound.

In some examples, the processor may determine a second 3D positioning for the second 2D object sound differently from the first 3D positioning, and generate, by applying the second 3D positioning and the second binaural effect to the second 2D object sound, the second 3D object sound.

In some examples, the processor may generate the 3D sound track by muxing the plurality of 3D object sounds.

FIG. 1 illustrates a schematic block diagram of a system for generating a sound according to an embodiment.

A system 10 for generating a sound includes a sound provision device 100 and a sound generation device 300.

After generating (or recording) a play sound to be provided to a user (or a listener), the sound provision device 100 may provide the play sound to the sound generation device 300. The play sound can be various, such as a 3D sound source and 3D virtual reality (VR) sound content.

The play sound may be a sound generated in a virtual space. The virtual space may be a 3D virtual space (or 3D virtual reality) implemented to provide a 3D sound reflecting a sense of space and a sense realism.

After generating (or recording) a 2D sound track, the sound provision device 100 may provide the 2D sound track to the sound generation device 300.

The 2D sound track is a stereo or mono-type unidirectional sound track and may be a sound that can be heard by a listener. For example, the 2D sound track can be various, such as a 2D sound source, a 2D voice, and a 2D virtual reality (VR) sound.

The 2D sound track may include a plurality of object sounds. Each of the plurality of object sounds is a 2D sound, and may be an object sound generated from each of the plurality of objects.

The sound generation device 300 may generate a combined sound (mixed reality sound) generated in a mixed reality in which a real space and a virtual space are mixed by combining the real sound generated in the real space and the virtual sound generated in the virtual space.

Accordingly, the sound generation device 300 may provide a sound with high immersion feeling that allows the user to recognize that the user is positioned in a mixed space in which the real space and the virtual space are mixed.

The sound generation device 300 may provide a customized (or personalized) 3D sound to the user by selectively combining the real sound and the virtual sound.

The sound generation device 300 may allow the user to recognize a situation occurring in a real space and secure the user's safety by mixing and providing the real sound and the play sound without completely removing the real sound, thereby.

The sound generation device 300 may generate a 3D sound track reflecting a 3D object sound by converting each of a plurality of 2D object sounds of the 2D sound track into the 3D object sound.

Accordingly, the sound generation device 300 may provide various types of a 3D sound high immersion feeling (or 3D content) by reflecting a 3D directionality according to a 3D effect to each 2D object sound.

The sound generation device 300 may easily generate a 3D sound track by generating the 3D sound track using only the 2D sound track.

The sound generation device 300 may generate the 3D sound track that can be used in tinnitus treatment or tinnitus diagnosis through directional reproduction of a 3D sound track that is the characteristics of 3D sound (or 3D audio). For example, the sound generation device 300 may generate a 3D sound track that can be used for actual tinnitus treatment and tinnitus diagnosis by reflecting positional reproduction according to a frequency band to the 3D sound track.

The sound output device 500 may acquire the real sound generated in the real space. The real space may be a space in which a user for listening to the combined sound is positioned.

For example, the sound output device 500 can detect (or sense, acquire) the user's head direction (or the user's point of view, the user's gaze) by tracking the user's head (or by performing head tracking).

The sound output device 500 may acquire the 3D real sound according to the user's head direction through the microphones of the sound output device 500 positioned in both directions of the user. Both directions correspond to both ears of the user and may be a right ear direction and a left ear direction.

The sound output device 500 may transmit the real sound, sound acquisition information for the real sound, and/or head direction information of the user to the sound generation device 300.

The sound output device 500 may receive the combined sound transmitted from the sound generation device 300 and output (or provide) the combined sound to the user.

Accordingly, the user may listen to the combined sound generated in the mixed reality in which the real space and the virtual space are mixed through the sound output device 500.

The sound provision device 100, the sound generation device 300, and the sound output device 500 are configured to be independently distinguished but are not limited thereto. For example, the sound provision device 100 may be implemented by being included in the sound generation device 300, and the sound generation device 300 may be implemented by being included in the sound output device 500.

Figure 2:
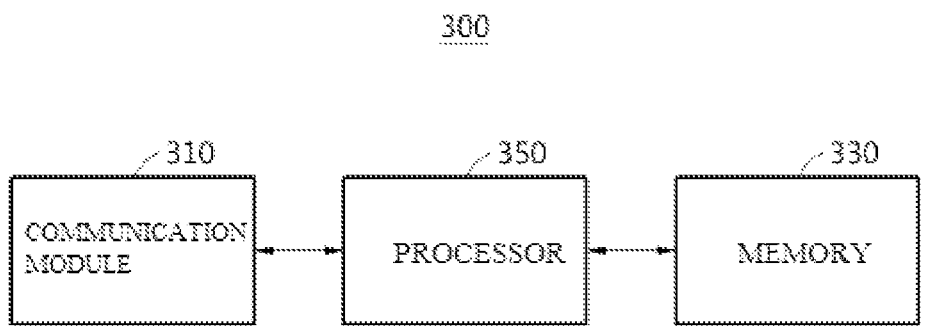
FIG. 2 illustrates a schematic block diagram of the sound generation device illustrated in FIG. 1.

FIG. 2 illustrates a schematic block diagram of the sound generation device illustrated in FIG. 1.

The sound generation device 300 may include a communication module 310, a memory 330, and a processor 350.

The communication module 310 may receive the 2D sound track or play sound transmitted from the sound provision device 100 and transmit it to the processor 350.

The communication module 310 may receive the real sound, sound acquisition time information for the real sound, and/or information on the user's head direction transmitted from the sound output device 100 and transmit it to the processor 350.

The communication module 310 may receive the combined sound transmitted from the processor 350 and transmit it to the sound output device 100.

The memory 330 may store instructions (or programs) executable by the processor 350. For example, the instructions may include instructions for executing an operation of the processor 350 and/or an operation of each configuration of the processor 350.

The processor 350 may process data stored in the memory 330. The processor 350 may execute computer-readable code (e.g., software) stored in the memory 330 and instructions induced by the processor 350.

The processor 350 may be a data processing device implemented in hardware including a circuit having a physical structure for executing desired operations. For example, desired operations may include code or instructions included in a program.

The processor 350 may be a data processing device implemented in hardware including a circuit having a physical structure for executing desired operations. For example, desired operations may include code or instructions included in a program.

For example, the data processing device implemented by hardware may include a microprocessor, a central processing unit, a processor core, a multi-core processor, and a multiprocessor (multiprocessor), an application-specific integrated circuit (ASIC), and a field programmable gate array (FPGA).

The processor 350 may control the overall operation of the sound generation device 300. For example, the processor 350 may control the operation of each of configurations 310 and 330 of the sound generation device 300.

The processor 350 may acquire the real sound, sound acquisition time information for the real sound, and/or information about the user's head direction transmitted from the sound output device 500.

The real sound may include a plurality of real object sounds. Each of the plurality of real object sounds may be a sound generated from each of a plurality of real objects positioned in the real space. The sound generated from the real object may be an object sound corresponding to the real object. Real objects can be various, such as people, animals, and objects positioned in the real space. The object sound corresponding to the real object can be various, such as the voice of a person positioned in the real space, the crying sound and footstep of an animal, and the horn sound of a vehicle.

The sound acquisition time information for the real sound may include the sound acquisition time of each of the plurality of real object sounds. The sound acquisition times of the real object sound acquired in the right ear direction and the real object sound acquired in the left ear direction may be different from each other.

The processor 350 may acquire the play sound transmitted from the sound provision device 100.

The play sound may include a plurality of virtual object sounds. Each of the plurality of virtual object sounds may be a sound generated from each of a plurality of virtual objects arranged in a virtual space. The sound generated from the virtual object is an object sound corresponding to the virtual object and may be an object sound that has already been recorded and/or generated. When the play sound is the 3D sound source, the virtual object can be various objects that make up the sound source, such as drums, guitars, bass, and vocals. When the play sound is 3D VR sound content, the virtual object can be various objects that make up 3D VR sound content such as people, animals, and objects included in the 3D virtual reality corresponding to 3D VR sound content. When the play sound is the 3D sound source, the object sound corresponding to the virtual object can be various sounds that make up the sound source, such as a previously recorded drum sound, guitar sound, bass sound, and vocal sound. When the play sound is 3D VR sound content, the object sound corresponding to the virtual object can be various sounds that make up 3D VR sound content, such as a person's voice, the crying sound and footstep of an animal, and the horn sound of a vehicle that have already been recorded.

The processor 350 may generate a combined sound by selectively combining the real sound and the play sound.

First, the processor 350 may select at least one real object sound from among a plurality of real object sounds included in the real sound.

For example, the processor 350 may recognize a plurality of real object sounds included in the real sound based on the characteristics of the previously stored object sound. The characteristics of the object sound may be the frequency characteristics and volume characteristics of the object sound.

The processor 350 may remove a noise sound from the real sound based on the noise filtering technique. For example, the processor 350 may remove a sound corresponding to a general noise sound by analyzing noise generated in the real space. The noise sound may be a sound corresponding to general noise. The noisy sound may be a sound of which frequency is a significantly higher than that of a sound corresponding to a general audible frequency.

The processor 350 may recognize the plurality of real object sounds from the real sound from which the noise sound has been removed based on the frequency and/or volume of the previously stored object sounds. For example, the processor 350 may detect sounds corresponding to the frequency and/or volume of previously stored object sounds from the real sounds from which the noise sound has been removed and recognize the detected sounds as the plurality of real object sounds.

The processor 350 may selectively extract at least one real object sound generated from dangerous objects that are dangerous to the user and/or objects of interest that the user is interested in from among the plurality of real object sounds based on the real sound selection condition. A real sound selection condition may be set such that an object sound corresponding to the dangerous object and the object of interest is selected from among the plurality of real object sounds. The dangerous object and the object of interest can be preset by the user.

Thereafter, the processor 350 may select at least one virtual object sound from among a plurality of virtual object sounds included in the play sound.

For example, the processor 350 may select all or some of the plurality of virtual object sounds based on the user's motion. The user's motion can be various, such as the number of rotations of the user's head and the speed of rotation of the user's head.

When the number of rotations of the user's head is greater than or equal to a threshold number of rotations and/or the rotational speed of the user's head is greater than or equal to a threshold rotational speed, the processor 350 may select all of the plurality of virtual object sounds.

When the number of rotations of the user's head is less than the threshold number of rotations and/or the rotation speed of the user's head is less than the threshold rotation speed, the processor 350 may select some of the plurality of virtual object sounds.

Although a method of selecting all or some of the plurality of virtual object sounds is described as above but is not limited thereto. The processor 350 may select a virtual object sound by applying the method of selecting all or some of the plurality of virtual object sounds in an opposite manner to each other. For example, the processor 350 may select all of the plurality of virtual object sounds when the number of rotations of the head is less than the threshold rotation speed and/or the rotation speed of the head is less than the threshold rotation speed. The processor 350 may select some of the plurality of virtual object sounds when the number of rotations of the head is greater than or equal to the threshold number of rotations and/or the rotation speed of the head is greater than or equal to the threshold rotational speed.

When some of the plurality of virtual object sounds are selected, the processor 350 may select a virtual object sound corresponding to a virtual object positioned in the user's head direction from among the plurality of virtual object sounds based on the user's head direction.

Finally, the processor 350 may generate the combined sound by combining at least one real object sound and at least one virtual object sound.

For example, the processor 350 may adjust the volume of at least one real object sound based on a position of the real object corresponding to the at least one real object sound.

The processor 350 may determine the position of the real object corresponding to the at least one real object sound in the real space based on the sound acquisition time for at least one real object sound.

The processor 350 may adjust the volume of at least one real object sound based on a separation distance between the position of the user and the position of the real object.

For example, the processor 350 may adjust the volume of at least one real object sound based on a threshold volume corresponding to the separation distance and the volume of at least one real object sound. The threshold volume corresponding to the separation distance may be preset. The threshold volume is a volume range which is set for each separation distance between a user and an object and may be a volume range that is not dangerous to the user.

When the volume of the at least one real object sound is higher than the threshold volume, the processor 350 may adjust the volume of the at least one real object sound to be low within the threshold volume range.

When the volume of the at least one real object sound is lower than the threshold volume, the processor 350 may adjust the volume of the at least one real object sound to be high within the threshold volume range.

The processor 350 may generate the combined sound by combining at least one real object sound of which the volume amount is adjusted and at least one virtual object sound.

After acquiring the 2D sound track through the communication module 310, the processor 350 may extract a plurality of 2D object sounds included in the 2D sound track. The plurality of 2D object sounds may be sounds separated by any one of a frequency and an object in the 2D sound track in the 2D sound track.

For example, the processor 350 may extract the plurality of 2D object sounds included in the 2D sound track by separating the 2D sound track for each frequency band using an equalizer effect (EQ).

As another example, the processor 350 may extract the plurality of 2D object sounds included in the 2D sound track by separating the 2D sound track for each object using sound detecting.

The processor 350 may convert the plurality of 2D object sounds into a plurality of 3D object sounds by applying each of a plurality of binaural effects to each of the plurality of 2D object sounds. Each of the plurality of 3D object sounds may be a 3D binaural sound acquired by converting the 2D object sound into the 3D object sound.

The processor 350 may generate first 3D object sounds by applying a first binaural effect to a first 2D object sound among the plurality of 2D object sounds.

For example, the processor 350 may determine a first 3D positioning for the first 2D object sound. The processor 350 may generate a first 3D object sound by applying the first 3D positioning and the first binaural effect to the first 2D object sound. The first 3D object sound may be a 3D sound acquired by converting the first 2D object sound into the 3D sound.

The processor 350 may generate a second 3D object sound by applying a second binaural effect to a second 2D object sound among the plurality of 2D object sounds.

For example, the processor 350 may determine a second 3D positioning for the second 2D object sound differently from the first 3D positioning. The processor 350 may generate a second 3D object sound by applying the second 3D positioning and the second binaural effect to the second 2D object sound. The second 3D object sound may be a 3D sound acquired by converting the second 2D object sound into the 3D sound.

The first binaural effect and the second binaural effect described above may be different from each other or may be the same binaural effect.

processor 350 may generate the 3D sound track based on the plurality of 3D object sounds. The 3D sound track may be a sound track acquired by converting a 2D sound of the 2D sound track into the 3D sound.

For example, the processor 350 may generate a 3D sound track in which a plurality of 3D object sounds are multiplexed by muxing the plurality of 3D object sounds.

Hereinafter, for convenience of description, it is assumed that the sound generation device 300 is implemented in the sound output device 500, and the 2D sound track is assumed to be the 2D sound source.

Figure 3:
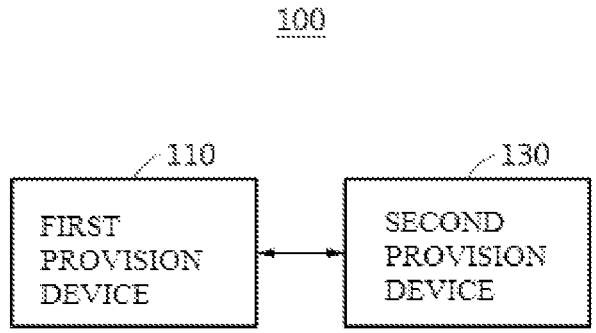
FIG. 3 illustrates an example for describing the sound provision device illustrated in FIG. 1.
Figure 4:
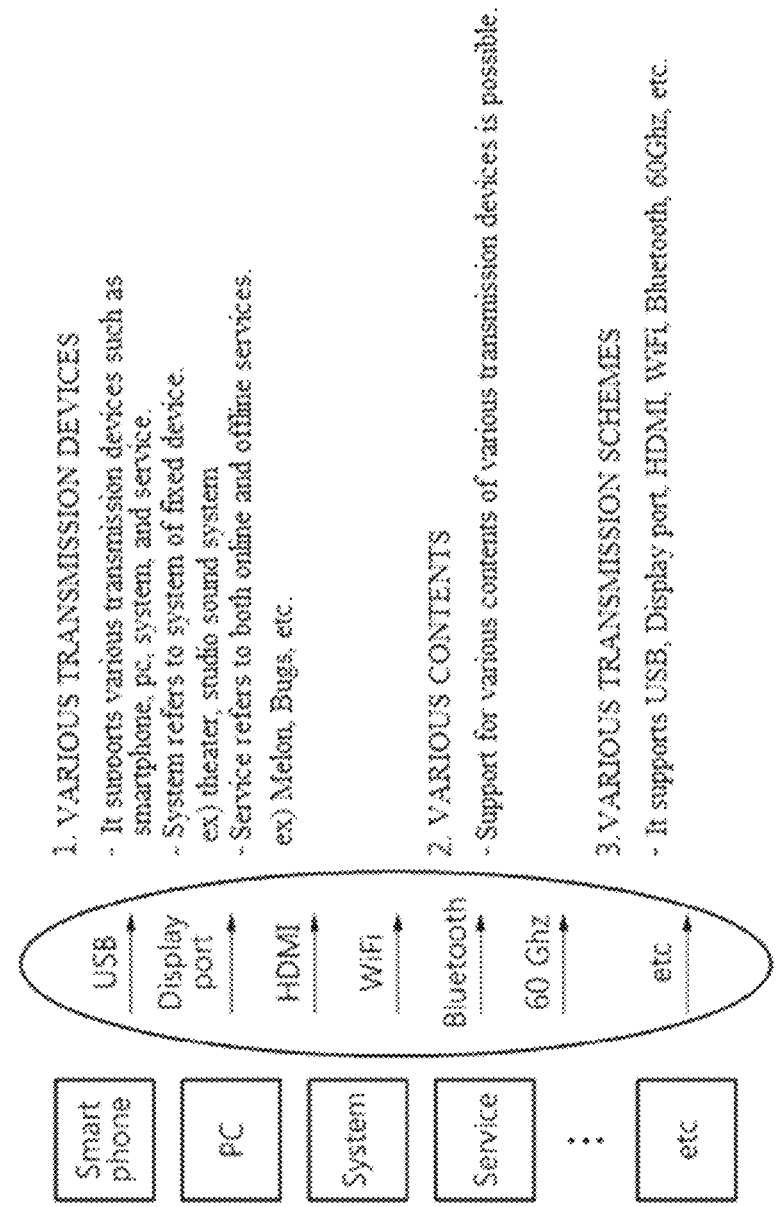
FIG. 4 illustrates an example for describing the sound provision device illustrated in FIG. 1 or an example for describing the first provision device illustrated in FIG. 3.
Figure 5:
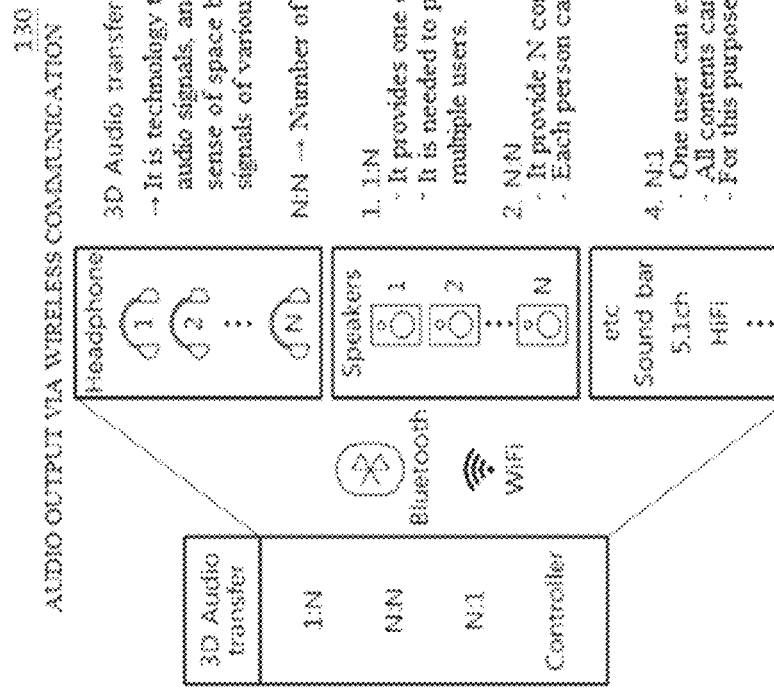
FIG. 5 illustrates an example for describing the sound generation device illustrated in FIG. 1 or an example for describing the second provision device illustrated in FIG. 3.

FIG. 3 illustrates an example for describing the sound provision device illustrated in FIG. 1, FIG. 4 illustrates an example for describing the first provision device illustrated in FIG. 3, and FIG. 5 illustrates an example for describing the second provision device illustrated in FIG. 3.

The sound provision device 100 is an electronic device that generates a play sound, which is immersive 3D sound content, and provides the play sound to the sound generation device 300 used by the user and may be an MP3 player. The play sound can be various, such as a 3D sound source, a 3D voice, and a 3D virtual reality (VR) sound.

The electronic device can be various devices such as a personal computer (PC), a data server, or a portable electronic device. The portable electronic devices may be implemented by a laptop computer, mobile phone, smart phone, tablet PC, mobile internet device (MID), personal digital assistant (PDA), enterprise digital assistant (EDA), digital still camera, digital video camera, portable multimedia player (PMP), personal navigation device or portable navigation device (PND), handheld game console, e-book, or a smart device. In this case, the smart device may be implemented by a smart watch or a smart band.

The sound provision device 100 includes a first provision device 110 and a second provision device 130.

The first provision device 110 may provide an already recorded object sound or a general 2D audio-only sound to the second provision device 130. For example, the first provision device 110 may provide the object sound or the general 2D audio-only sound to the second provision device 130 in wired methods and/or wireless methods. The general 2D audio-only sound may be general mono-channel or stereo-channel audio, and multi-channel audio. The wired methods can be various wired methods such as USB, display port, and HDMI. The wireless methods can be various wireless methods such as Wi-Fi and Bluetooth.

The second provision device 130 may generate the play sound by reflecting an object sound in the 3D virtual space or converting the general 2D audio-only sound into the 3D sound.

For example, the second provision device 130 may generate the play sound using a binaural recording technology and/or a binaural effect technology. The binaural recording technology may be a technology for recording the 3D sound using a 3D microphone. The 3D microphone can be various, such as a 360-degree microphone and a microphone composed of a plurality of microphones. The binaural effect may be a technology for generating the 3D sound through a stereo speaker based on a spatial recognition technology of a sound direction through a sound transmission difference according to the positions of both ears of a human being.

The second provision device 130 may arrange a virtual object in the 3D virtual space using sound information of compass mems and accelerator mems so that the object sound corresponding to the virtual object is reflected in the 3D virtual space. The second provision device 130 may generate the play sound generated in the 3D virtual space in which the object sound is reflected.

The second providing device 130 may convert the general 2D audio-only sound into a 3D audio-only sound to generate a play sound converted into the 3D audio-only sound. For example, the play sound converted into the 3D audio-only sound may be 3D content acquired by converting (or diverting) a non-3D sound (or non-3D audio, non-3D sound source) or a multi-channel sound (or multi-channel audio) such as 5.1 channel into a 3D sound (3D audio). 3D content can be various, such as 3D 5.1 channel and 3D 10.1 channel.

The second provision device 130 may provide the play sound in various methods.

For example, the second provision device 130 may provide the play sound to the sound output device 500 used by each of a plurality of users in a 1:N scheme. The 1:N scheme may be a broadcast type method in which the play sound is allowed to be provided to the plurality of users.

The second provision device 130 may selectively provide a plurality of play sounds to the sound output device 500 used by each of the plurality of users in an N:N scheme. The N:N scheme may be a customized method in which the plurality of play sounds are allowed to be selectively provided to the plurality of users.

The second provision device 130 may provide all of the plurality of play sounds to the sound output device 500 used by a single user in an N:1 scheme. The N:1 scheme may be a service-intensive multi-access scheme in which the plurality of play sounds are provided to the single user.

The second provision device 130 may provide the play sound to the sound output device 500 through the wired methods and/or the wireless methods described above.

FIG. 6 illustrates an example for describing the sound output device illustrated in FIG. 1, and FIG. 7 illustrates another example for describing the sound output device illustrated in FIG. 1.

The sound output device 500 may be a device used by the user to listen to the play sound or the combined sound.

The sound output device 500 may be implemented in a wearable type, an in-ear type, an on-ear type, and a brain trans type.

For example, the sound output device 500 may be an MP3 player implemented by the wearable type, the in-ear type, the on-ear type, and the brain trans type. The MP3 player has a built-in battery that operates independently and may include wireless communication and a processor. The wearable type may be a type combined with a product that the user conveniently wears. The wearable type may be a hair band, a shoulder-attached device, a jumper and/or a jacket and/or a top-attached device such as a space suit, goggles, and glasses. The in-ear type may be an earphone. The on-ear type may be a headphone, a helmet, etc. The brain trans type may be a brain wave transmission device.

In addition, the sound output device 500 may be implemented in an HMD, a smart glass, a see-thru display device, a haptic device using a multi-modal (for example, five senses sensing), and a bone conduction audio device.

When the sound output device 500 is the in-ear type or the on-ear type, the sound output device 500 may directly output the play sound or the combined sound to the user's ear so that the user listens directly.

When the sound output device 500 is the wearable type or the brain trans type, the sound output device 500 may sense the position of the user's ear and indirectly outputs the play sound or the combined sound to the user's ear so that the user listens indirectly.

The sound output device 500 accurately tracks the user's head using compass mems, gyroscope, and accelerator mems, and thus may acquire the real sound generated in the real space in three dimensions.

In addition, the sound output device 500 may provide various functions such as an energy harvesting function and a black box function as additional functions. For example, the sound output device 500 may have the energy harvesting function that converts heat of the user's contact part into electrical energy, ambient radio frequency (RF) or ambient sound into electrical energy, and kinetic energy of the listener's motion into electrical energy and may be driven without a separate energy supply source.

When providing the black box function to the sound output device 500, the position of an actual storage of the black box may be implemented inside and/or outside the black box. The black box can store data through various methods such as storage using internal memory storage and/or external storage and blockchain. The external storage can be an external storage such as a cloud connection. The black box can use a security key such as a PKI for authority of the accessor for security.

The black box may be a camera built-in black box and/or an audio black box and/or a black box based on a physical sensor. The audio black box may store surrounding sound in real time and/or store audio data transmitted and received during driving and may be able to read sound for each position upon storage. The audio black box may be a sound-based black box through audio-based position reading including 3D audio storage adapted for easy analyze of danger and after danger, storage of position information for each object, etc.

The black box may be a black box having various functions. The black box may have a real-time storage function. For example, the black box includes a real-time call, real-time stream, real-time surrounding recording function, and may include a function capable of playing back when necessary. In addition, the black box may further include a function of storing and saving real-time information.

For example, the black box may sense an event, which is a surrounding sound, and store the event in real time at a specific time. For example, the black box may sense a call conversation, an important conversation, an occurrence of accident, etc., and store (or record) data for a few minutes before or after the start of the detection occurrence time. In this case, the black box may perform storage based on an event rather than a method of always storing.

As another example, the black box may store position information of an object. For example, the black box may sense a thing object in a specific space, an object with sound, an animal and/or a person, read it as an object, and store position information of the object in 3D information. In this case, the black box may store the position information by reflecting a few minutes before and after the start of the detection occurrence time, a specific time, etc.

As another example, the black box may store audio data and information data, such as content of a transmission and reception call exchanged during driving, a sound source being played, a stream audio in real time or by reflecting a specific time.

As another example, the black box can be used as an interface for spatial storage, indicator control, etc. by reading recognition through sound such as voice recognition with 3D position-based object recognition through space and object recognition. When several people have a conversation in one space, it is difficult for the black box to perform user recognition for recognizing who is the user, and thus, the black box may perform 3D spatial recognition based on sound and control recognition by discriminating an indicator. In this case, the black box can store the space in real time in three dimensions and use it for storage for each object.

In the following, for convenience of description, the sound output device 500 is assumed to be an in-ear type earphone.

Figure 8:
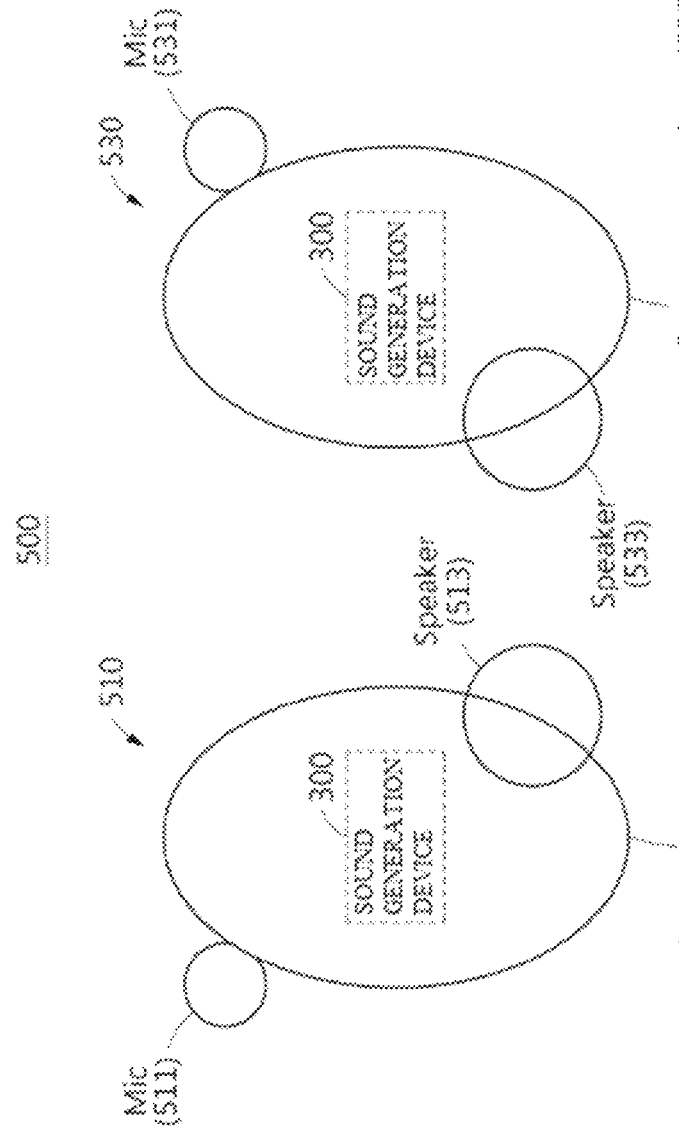
FIG. 8 illustrates an example for describing a sound output device that is an in-ear type earphone.
Figure 9:
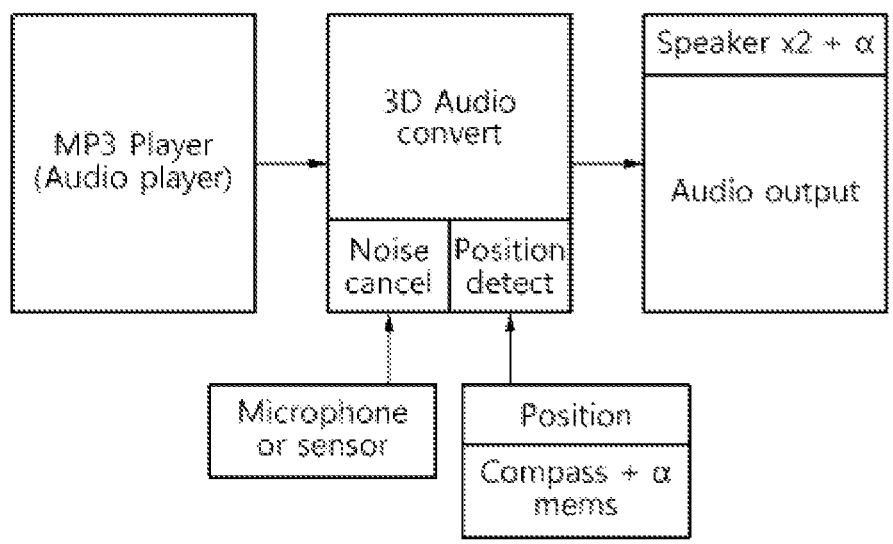
FIG. 9 illustrates another example for describing the sound output device that is the in-ear type earphone.

FIG. 8 illustrates an example for describing a sound output device that is an in-ear type earphone, and FIG. 9 illustrates another example for describing a sound output device that is an in-ear type earphone.

The sound output device 500 may be a plurality of earphones 510 and 530 worn by a user.

The first earphone 510 is an earphone worn on the user's left ear, and may include a first microphone 511, a first speaker 513, and a first processor 515.

The second earphone 530 is an earphone worn on the user's right ear, and may include a second microphone 531, a second speaker 533, and a second processor 535.

The first earphone 510 and the second earphone 530 may include the sound generation device 300.

The first processor 515 and the second processor 535 may share data with each other.

The first processor 515 and the second processor 535 may acquire a real sound by filtering noise in the real space through the first microphone 511 and the second microphone 531. For example, the first processor 515 and the second processor 535 may analyze information of noise around the user and acquire the real sound from which noise has been removed through a noise canceling function. In this case, the sound acquisition time of the real sound acquired through the first microphone 511 and the sound acquisition time of the real sound acquired through the second microphone 513 may be different.

The first processor 515 and the second processor 535 may recognize the real sound as a 3D real sound corresponding to the real space based on the difference in sound acquisition time of the real sound acquired through the first microphone 511 and the second microphone 531.

The first processor 515 and the second processor 535 may acquire the user's head direction by tracking the user's head using the compass mems. In this case, the first processor 515 and the second processor 535 may perform more accurate head tracking using the gyroscope, accelerator mems, etc. in addition to the compass mems.

The first processor 515 and the second processor 535 may transmit the real sound, sound acquisition time of the real sound acquired through the first microphone 511, sound acquisition time of the real sound acquired through the second microphone 513, and information on the user's head direction to the sound generating device 300.

The first processor 515 and the second processor 535 may output the play sound or the combined sound through the first speaker 513 and the second speaker 533.

When outputting the play sound, the first processor 515 and the second processor 535 may acquire the play sound through the MP3 player that is the sound provision device 100 and then output the play sound to which the 3D sound effect is applied through a 3D audio converter. The play sound to which the 3D sound effect is applied may be a sound to which a 3D audio effect such as the binaural effect is applied. The sound to which the 3D audio effect is applied may be a sound to which a multi-channel 3D audio effect is reflected according to the number of speakers. The sound reflecting the multi-channel 3D audio effect can be various, such as 5.1-channel sound, 7.1-channel sound, and 10.1-channel sound.

As illustrated in FIG. 8, although two microphones 511 and 531 and speakers 531 and 533 are illustrated but is not limited thereto. For example, the real sound can be acquired by implementing a plurality of microphones. The play sound or the combined sound can be output by implementing a plurality of speakers.

Figure 10:
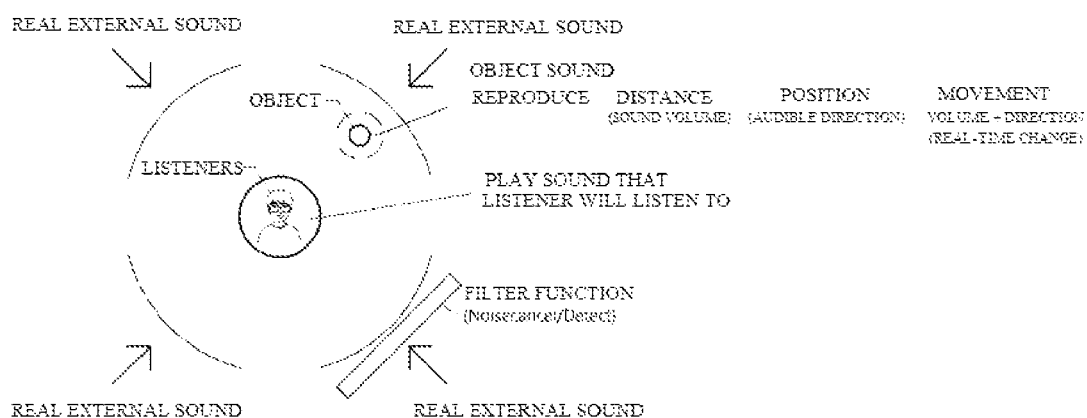
FIG. 10 illustrates an example for describing a combined sound according to an embodiment.

FIG. 10 illustrates an example for describing a combined sound according to an embodiment.

The combined sound may be a 3D sound generated in a mixed space in which a virtual space and a real space are mixed. The virtual space can be various, such as a street mode, a forest, a travel destination, a space with memories, and an outer space. The real space may be a space where a listener is currently positioned, such as a cafe or a restaurant. The mixed space can be various, such as a cafe positioned on the street or a restaurant positioned in the forest.

Specifically, when a user is positioned in a cafe and the user listens to a virtual reality sound generated in outer space, the mixed space may be a space in which the cafe and outer space are mixed.

When a user is positioned in a restaurant and the user listens to a virtual reality sound generated in Hawaii, the mixed space may be a space where the restaurant and Hawaii are mixed.

The virtual object sound generated in the virtual space may be a 3D sound in which a distance (sound size), a position (sound direction), and movement (change in sound size and direction) of the virtual object positioned in the virtual space are reflected.

The real object sound generated in the real space may be a 3D sound in which the distance (sound size), position (sound direction), and movement (changes in sound size and direction) of the real object in the real space are reflected.

Figure 11:
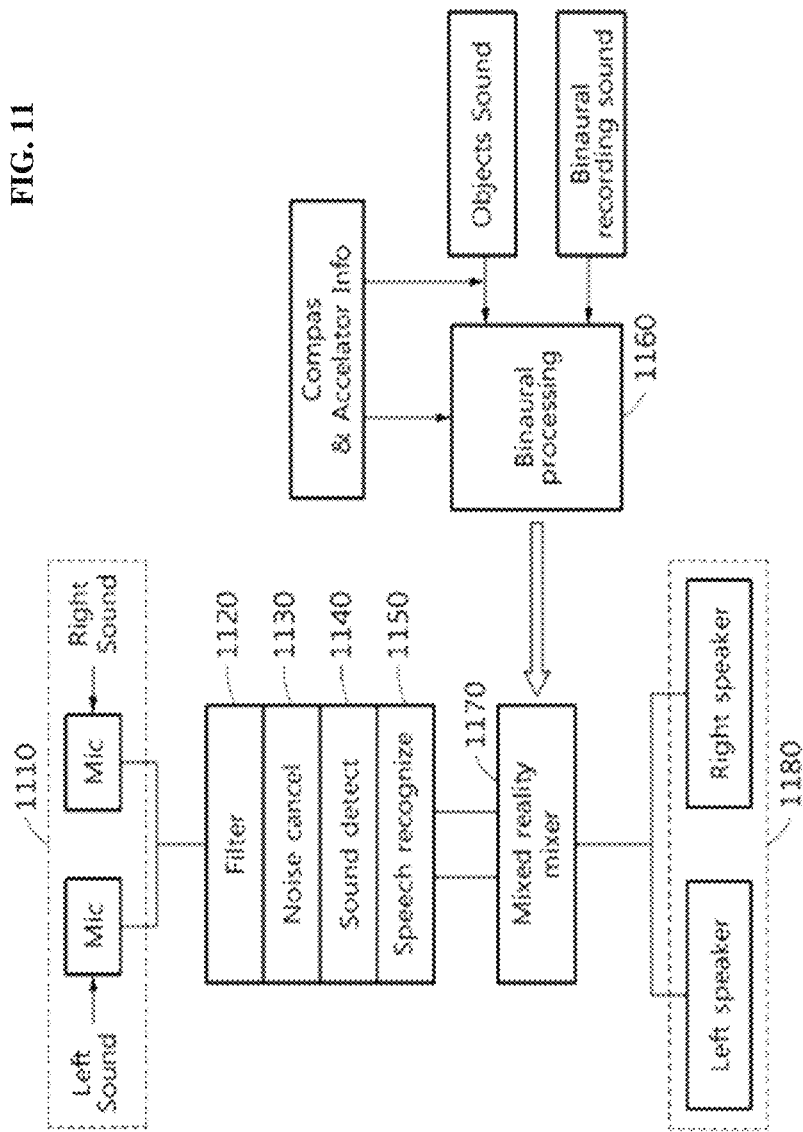
FIG. 11 is a flowchart illustrating an operation of the sound generation device illustrated in FIG. 1.

FIG. 11 is a flowchart illustrating an operation of the sound generation device illustrated in FIG. 1.

The processor 350 may acquire a real sound through the first microphone 511 and the second microphone 531 of the sound output device 500 (1110).

The processor 350 may filter a plurality of real object sounds from the real sound based on a filter (1120). The filter may be an audio filter of various types, such as a real time filter. For example, the processor 350 may remove the noise sound from the real sound based on the noise filtering technique (1130).

The processor 350 may detect a sound corresponding to the frequency and volume of the object sound from the real sound from which noise has been removed based on at least one of the frequency and volume of the object sound (1140).

The processor 350 may recognize the detected sound as a plurality of real object sounds (1150).

The processor 350 may acquire the play sound transmitted from the sound provision device 500 (1160).

The processor 350 may generate a combined sound by combining at least one real object sound among a plurality of real object sounds of the real sound and at least one virtual object sound among a plurality of virtual object sounds of the play sound (1170).

The processor 350 may provide the combined sound to the user through the first speaker 513 and the second speaker 533 of the sound output device 500 (1180).

In the following, a system for generating a sound according to another exemplary embodiment will be described with reference to FIGS. 12 to 14.

Figure 12:
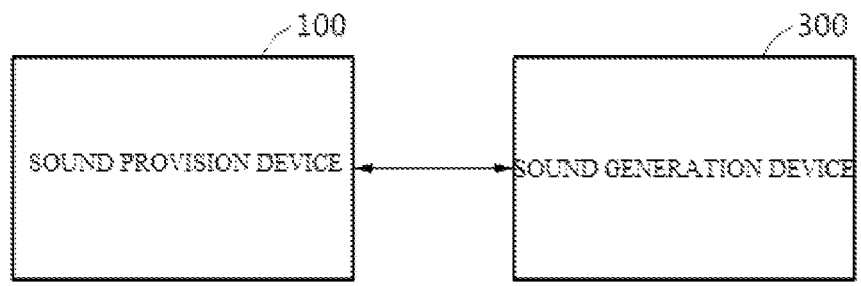
FIG. 12 illustrates a system for generating a sound according to another embodiment.

FIG. 12 illustrates a system for generating the sound according to another embodiment.

Technical matters described with reference to FIGS. 1 to 12 are equally applied to each configuration in FIGS. 12 to 14.

A system 20 for generating a sound includes the sound provision device 100 and the sound generation device 300.

The sound provision device 100 may provide a 2D sound track, which is a general 2D audio-only sound, to the sound generation device 300. The general 2D audio-only sound may be a 2D sound that is not recorded by applying the 3D sound effect.

For example, the sound provision device 100 may generate a 2D sound track composed of a plurality of object sounds.

The sound provision device 100 may generate a 2D sound track by recording sounds played by each of various musical instruments.

The sound provision device 100 may generate a 2D sound track by combining object sounds for each musical instrument already recorded (or already generated).

The sound provision device 100 may transmit the 2D sound track to the sound generation device 300 through wired communication methods and/or wireless communication methods. The wired communication methods may be a communication method using various wired communication methods such as USB, display port, and HDMI. The wireless communication methods may be communication methods using various wireless communication methods such as Wi-Fi and Bluetooth.

The sound generation device 300 may convert the 2D sound track into a 3D sound track reflecting the 3D virtual space by arranging each of a plurality of 2D object sounds in a 3D virtual space using the binaural effect technology.

The binaural effect may be a technology for generating a 3D sound through a stereo speaker based on a spatial recognition technology of a sound direction through a sound transmission difference according to the positions of both ears of a human being.

The 3D sound track may be a 3D audio-only sound reflecting the sense of space, sense of realism, and directionality of the sound. The 3D audio-only sound may be a 3D sound obtained by converting a non-3D sound (or non-3D audio, non-3D sound source) or a multi-channel 2D sound (or multi-channel 2D audio) such as 5.1-channel into three-dimensional. The 3D audio-only sound may be a 3D sound of various channels such as 3D 2 channel, 3D 5.1 channel, 3D 10.1 channel, etc.

The sound generation device 300 may provide the 3D sound track to the electronic device in various ways.

The electronic device can be various devices such as a sound output device, a personal computer (PC), a data server, or a portable electronic device. The portable electronic devices may be implemented by a laptop computer, mobile phone, smart phone, tablet PC, mobile internet device (MID), personal digital assistant (PDA), enterprise digital assistant (EDA), digital still camera, digital video camera, portable multimedia player (PMP), personal navigation device or portable navigation device (PND), hand-held game console, e-book, or a smart device. In this case, the smart device may be implemented by a smart watch or a smart band.

For example, the sound generation device 300 may provide the 3D sound track to the sound output device used by each of a plurality of listeners in a 1:N scheme. The 1:N scheme may be a broadcast type scheme in which the 3D sound track is provided to a plurality of listeners.

The sound generation device 300 may selectively provide the 3D sound track to the sound output device used by each of a plurality of listeners in an N:N scheme. The N:N scheme may be a customized method in which a plurality of 3D sound tracks are selectively provided to the plurality of listeners.

The sound generation device 300 may provide all of the plurality of 3D sound tracks to the sound output device used by a single listener in an N:1 scheme. The N:1 scheme may be a service-intensive multi-access scheme in which the plurality of 3D sound tracks are provided to a single listener.

The sound generation device 300 may provide the 3D sound track to the sound output device through the wired communication methods and/or wireless communication methods described above.

The sound output device described above may be implemented by the wearable type, the in-ear type, the on-ear type, and the brain trans type.

The wearable type may be a type combined with a product that the user conveniently wears. The wearable type may be a hair band, a shoulder-attached device, a jumper and/or a jacket and/or a top-attached device such as a space suit, goggles, and glasses. The in-ear type may be an earphone. The on-ear type may be a headphone, a helmet, etc. The brain trans type may be a brain wave transmission device.

In addition, the sound output device may be implemented in an HMD, a smart glass, a see-thru display device, a haptic device using a multi-modal (for example, five senses sensing), and a bone conduction audio device.

Figure 13:
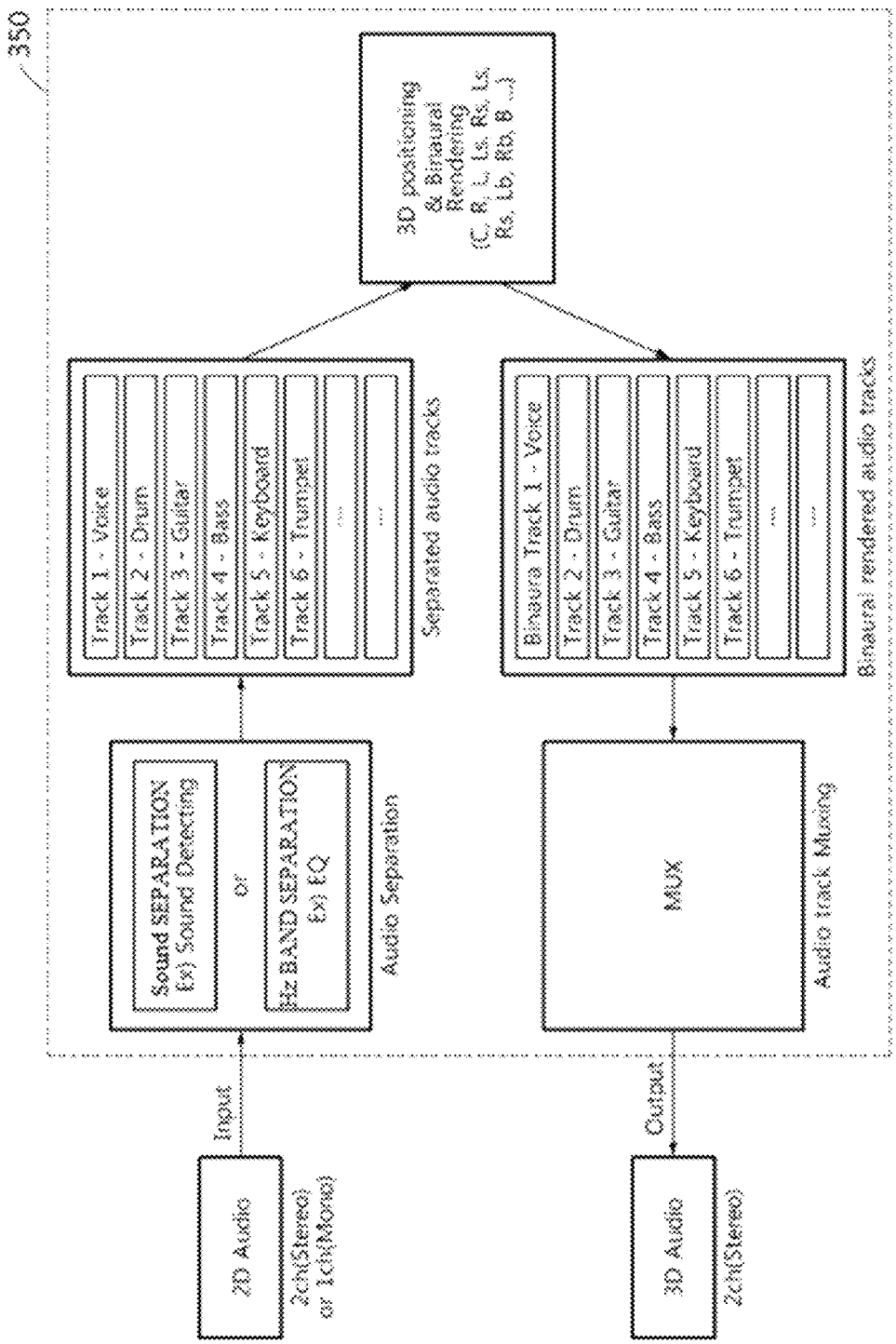
FIG. 13 illustrates an example for describing the operation of the sound generation device illustrated in FIG. 12.

FIG. 13 illustrates an example for describing the operation of the sound generation device illustrated in FIG. 12.

The sound generation device 300 may include the communication module 310, the memory 330, and the processor 350. Basic technical matters for each of the configurations 310, 330, and 350 are substantially the same as those described in FIG. 3.

The processor 350 may acquire a 2D sound track. The 2D sound track may be a 2 channel stereo or 1 channel mono type sound.

The processor 350 may extract a plurality of 2D object sounds included in the 2D sound track by separating the 2D sound track for each object and frequency.

For example, the processor 350 may detect the plurality of 2D object sounds included in the 2D sound track using sound detecting. The processor 350 may extract each of the plurality of 2D object sounds, which are sounds for each object by separating the 2D sound track for each object corresponding to the detected 2D object sound. The plurality of 2D object sounds may be various musical instrument sounds such as a violin sound, a drum sound, a guitar sound, a bass sound, a keyboard sound, and a trumpet sound.

The processor 350 may index a designation (or name) of an object corresponding to each of the plurality of 2D object sounds to each of the plurality of 2D object sounds and manage (or store) it as a sound track (or audio track). For example, the processor 350 may index a violin to the violin sound and manage it as a first 2D track. The processor 350 may index a drum to the drum sound and manage it as a second 2D track. The processor 350 may index a guitar to the guitar sound and manage it as a third 2D track. The processor 350 may index a bass to the bass sound and manage it as a fourth 2D track. The processor 350 may index a keyboard to the keyboard sound and manage it as a fifth 2D track. The processor 350 may index a trumpet into the trumpet sound and manage it as a sixth 2D track.

The processor 350 may differently determine the 3D positioning for the first 2D track to the 6th 2D track.

The processor 350 may convert the first 2D track to the sixth 2D track into the first 3D track to the sixth 3D track by applying different 3D positioning and binaural effects to the first 2D tracks to the sixth 2D tracks. In this case, the processor 350 may separate the first 2D track to the sixth 2D track into a plurality of channels, and then apply (or render) the binaural effect to the first 2D track to the sixth 2D track separated into the plurality of channels.

The processor 350 may generate a 3D sound track by muxing the first 3D track to the sixth 3D track. The 3D sound track may be a plurality of channel 3D sounds to which a binaural effect is applied by converting a stereo or mono type 2D sound track.

Figure 14:
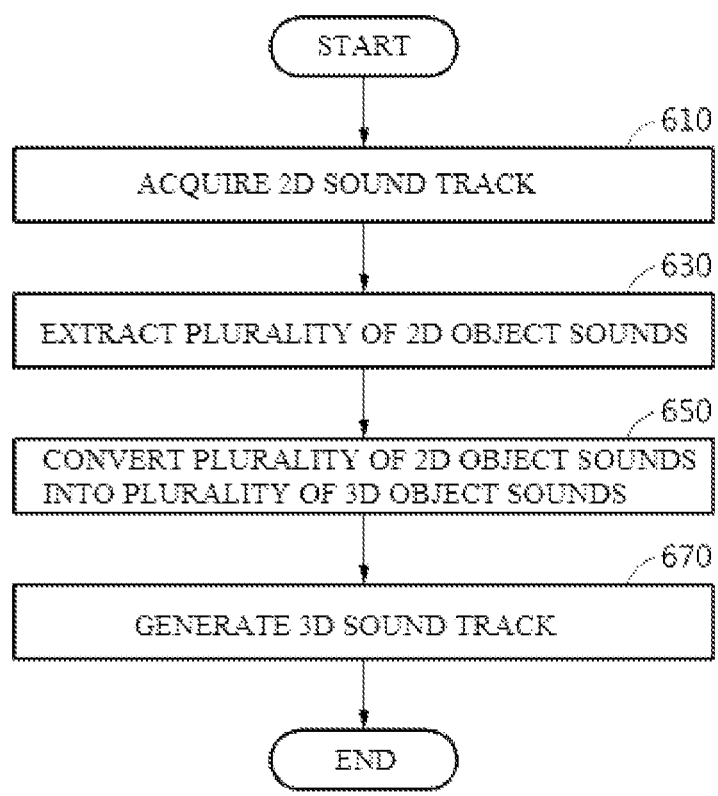
FIG. 14 illustrates a flowchart for describing an operation of the processor illustrated in FIG. 13.

FIG. 14 illustrates is a flowchart for describing an operation of the processor illustrated in FIG. 13.

The processor 350 may acquire a 2D sound track transmitted from the sound provision device 100 (610).

The processor 350 may extract a plurality of 2D object sounds included in the 2D sound track by separating the 2D sound track for each frequency and/or object using an equalizer effect and/or sound detection technology (630).

The processor 350 may convert the plurality of 2D object sounds into a plurality of 3D object sounds by applying each of a plurality of binaural effects to each of the plurality of 2D object sounds through binaural effect technology (650).

The processor 350 may generate a 3D sound track in which the 2D sound track is converted into a 3D sound by muxing the plurality of 3D object sounds (670).

The method according to the embodiment may be implemented in the form of program instructions executable through various computer means and recorded in a computer-readable medium. The computer-readable medium may include program instructions, data files, data structures, etc. alone or in combination. The program instructions recorded on the computer-readable medium may be specially designed and configured for the embodiment or may be known and usable to a person of ordinary skill in computer software. Examples of computer-readable recording media include magnetic media such as hard disks, floppy disks, and magnetic tapes, optical media such as CD-ROMs and DVDs, and magneto-optical media such as floptical disks, and hardware devices specially configured to store and allow program instructions to be executed, such as ROM, RAM, flash memory, etc. Examples of program instructions include not only machine language codes such as those produced by a compiler, but also high-level language codes executable by a computer using an interpreter or the like. The hardware device described above may be configured to operate as one or more software modules to perform the operation of the embodiment, and vice versa.

Software may include a computer program, code, instruction, or a combination of one or more of these, and may configure a processing device to operate as desired or may command the processing device independently or collectively. Software and/or data may be permanently or temporarily embodied in any type of machine, component, physical equipment, virtual equipment, computer storage medium or device, or a transmitted signal wave to be interpreted by the processing device or to provide instructions or data to the processing device. Software may be distributed on computer systems connected via a network and stored or executed in a distributed manner. Software and data may be stored on one or more computer-readable recording media.

Although the embodiments have been described by the limited drawings as described above, a person of ordinary skill in the related art can apply various technical modifications and variations thereto based on the above. For example, even if the described techniques are performed in an order different from the described method, and/or components such as systems, structures, devices, circuits, etc. described are coupled or combined in a form different from the described method, or substituted or replaced by other components or equivalents, appropriate results may be achieved.

Therefore, other implementations, other embodiments, and equivalents to claims fall within the scope of the following claims.

What is claimed:

1. A method for generating a sound, the method comprising:
    acquiring a real sound generated in a real space and a play sound generated in a virtual space; and
    generating, by combining the real sound and the play sound, a combined sound generated in a mixed reality in which the real space and the virtual space are mixed, the generated combined sound configured to audibly immerse a user in the generated combined sound to promote an experience by the user that the user is positioned in the mixed reality, wherein generating comprises adjusting a volume of at least one real object sound based, at least in part, on a position of a real object corresponding to the at least one real object sound and generating the combined sound by combining the at least one real object sound whose volume is adjusted and at least one virtual object sound.

2. The method of claim 1, wherein generating the combined sound comprises selecting the at least one real object sound from among a plurality of real object sounds included in the real sound, selecting the at least one virtual object sound from among a plurality of virtual object sounds included in the play sound, and combining the selected at least one real object sound and the selected at least one virtual object sound.

3. The method of claim 2, wherein the plurality of real object sounds comprise sounds generated from a plurality of real objects positioned in the real space.

4. The method of claim 2, wherein the plurality of virtual object sounds comprise sounds generated from a plurality of virtual objects positioned in the virtual space.

5. The method of claim 2, wherein selecting the at least one real object sound comprises recognizing the plurality of real object sounds based on sound characteristics of at least one real object sound, and selectively extracting the at least one real object sound from among the plurality of real object sounds based on a real object sound selection condition.

6. The method of claim 5, wherein recognizing comprises removing a noise sound from the real sound based on a noise filtering technique and recognizing the plurality of real object sounds from the real sound from which the noise sound has been removed based on at least one of a frequency and volume of the object sound.

7. The method of claim 1, wherein adjusting the volume of the at least one real object sound comprises determining the position of the real object in the real space based on a sound acquisition time of the at least one real object sound and adjusting the volume of the at least one real object sound based on a separation distance between the position of the user and the position of the real object.

8. A device comprising:
    a memory having instructions; and
    a processor for executing the instructions, wherein the processor acquires a real sound generated in a real space and a play sound generated in a virtual space and generates, by combining the real sound and the play sound, a combined sound generated in a mixed reality in which the real space and the virtual space are mixed, the combined sound generated configured to audibly immerse a user in the combined sound to promote an experience by the user that the user is positioned in the mixed reality, wherein generating comprises adjusting a volume of at least one real object sound based, at least in part, on a position of a real object corresponding to the at least one real object sound and generating the combined sound by combining the at least one real object sound whose volume is adjusted and at least one virtual object sound.

9. The device of claim 8, wherein the processor selects the at least one real object sound from among a plurality of real object sounds included in the real sound, selects the at least one virtual object sound from among a plurality of virtual object sounds included in the play sound, and combines the selected at least one real object sound and the selected at least one virtual object sound.

10. The device of claim 9, wherein the plurality of real object sounds comprise sounds generated from a plurality of real objects positioned in the real space.

11. The device of claim 9, wherein the plurality of virtual object sounds comprise sounds generated from a plurality of virtual objects positioned in the virtual space.

12. The device of claim 9, wherein the processor recognizes the plurality of real object sounds based on sound characteristics of at least one real object sound, and selectively extracts the at least one real object sound from among the plurality of real object sounds based on a real object sound selection condition.

13. The device of claim 12, wherein the processor removes a noise sound from the real sound based on a noise filtering technique and recognizes the plurality of real object sounds from the real sound from which the noise sound has been removed based on at least one of a frequency and volume of the object sound.

14. The device of claim 8, wherein the processor determines the position of the real object in the real space based on a sound acquisition time of the at least one real object sound and adjusts the volume of the sound of the at least one real object based on a separation distance between the position of the user and the position of the real object.

15. The device of claim 8 further comprising a black box having a real-time storage function.

16. The device of claim 15, wherein the black box includes a real-time call, real-time stream, real-time surrounding recording function, and a function capable of playing when necessary.

17. The device of claim 15, wherein the black box includes a function of storing and saving real-time information.

* * * * *